United States Patent
Nagai et al.

(10) Patent No.: US 9,924,068 B2
(45) Date of Patent: Mar. 20, 2018

(54) CONVERTING IMAGE DATA FOR PRINTING

(71) Applicant: CANON KABUSHIKI KAISHA, Tokyo (JP)

(72) Inventors: Hajime Nagai, Kawasaki (JP); Yoshinori Nakajima, Yokohama (JP); Yumi Shimokodachi, Kawasaki (JP); Hiroyuki Sakai, Chigasaki (JP); Tomokazu Yanai, Yokohama (JP); Naoya Takesue, Tokyo (JP); Hiroshi Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/157,682

(22) Filed: May 18, 2016

(65) Prior Publication Data

US 2016/0352963 A1     Dec. 1, 2016

(30) Foreign Application Priority Data

May 29, 2015   (JP) .................................. 2015-110803

(51) Int. Cl.
*H04N 1/387* (2006.01)
*H04N 1/393* (2006.01)
*G06T 3/40* (2006.01)

(52) U.S. Cl.
CPC ............ *H04N 1/3871* (2013.01); *G06T 3/40* (2013.01); *H04N 1/3935* (2013.01); *H04N 2201/0094* (2013.01)

(58) Field of Classification Search
CPC .............. H04N 1/3871; H04N 1/3935; H04N 2201/0094; G06T 3/40
See application file for complete search history.

(56) References Cited

U.S. PATENT DOCUMENTS

| 5,469,222 A | 11/1995 | Sprague |
| 6,606,423 B2 * | 8/2003 | Cho ............... G06T 3/4007 348/441 |

(Continued)

FOREIGN PATENT DOCUMENTS

| EP | 1 775 958 A1 | 4/2007 |
| JP | 2002-247346 A | 8/2002 |

OTHER PUBLICATIONS

Crochiere, et al., "Interpolation and Decimation of Digital Signals-A Tutorial Review", Proceedings of the IEEE, IEEE. New York, US, vol. 69, No. 3, Mar. 1, 1981(Mar. 1, 1981), pp. 300-331, XP000615159, ISSN:0018-9219 Section V; pp. 321, 329; figures 35, 38.

(Continued)

*Primary Examiner* — Iriana Cruz
(74) *Attorney, Agent, or Firm* — Fitzpatrick, Cella, Harper & Scinto

(57) ABSTRACT

Based on the resolution of acquired image data and a target resolution, a first resolution higher than the resolution of the image data and closest to the resolution of the image data is decided out of divisors of the target resolution. The image data is converted into first image data having the first resolution. The first image data is processed using a filter configured to compensate for degradation in quality of an image represented by the image data, which can occur when the image data is processed. The first image data processed using the filter is converted into second image data having the target resolution.

20 Claims, 13 Drawing Sheets

(56) References Cited

U.S. PATENT DOCUMENTS

2005/0213120 A1\* 9/2005 Ohkawa ................ G06T 3/4007
                                                    358/1.9
2009/0202165 A1\* 8/2009 Tabata .................. H04N 19/60
                                                    382/248
2011/0170121 A1   7/2011 Ishii et al.
2012/0063692 A1\* 3/2012 Kim ...................... H04N 19/51
                                                    382/233

OTHER PUBLICATIONS

European Search Report dated Sep. 28, 2016 in European Application No. 16001067.4.

\* cited by examiner

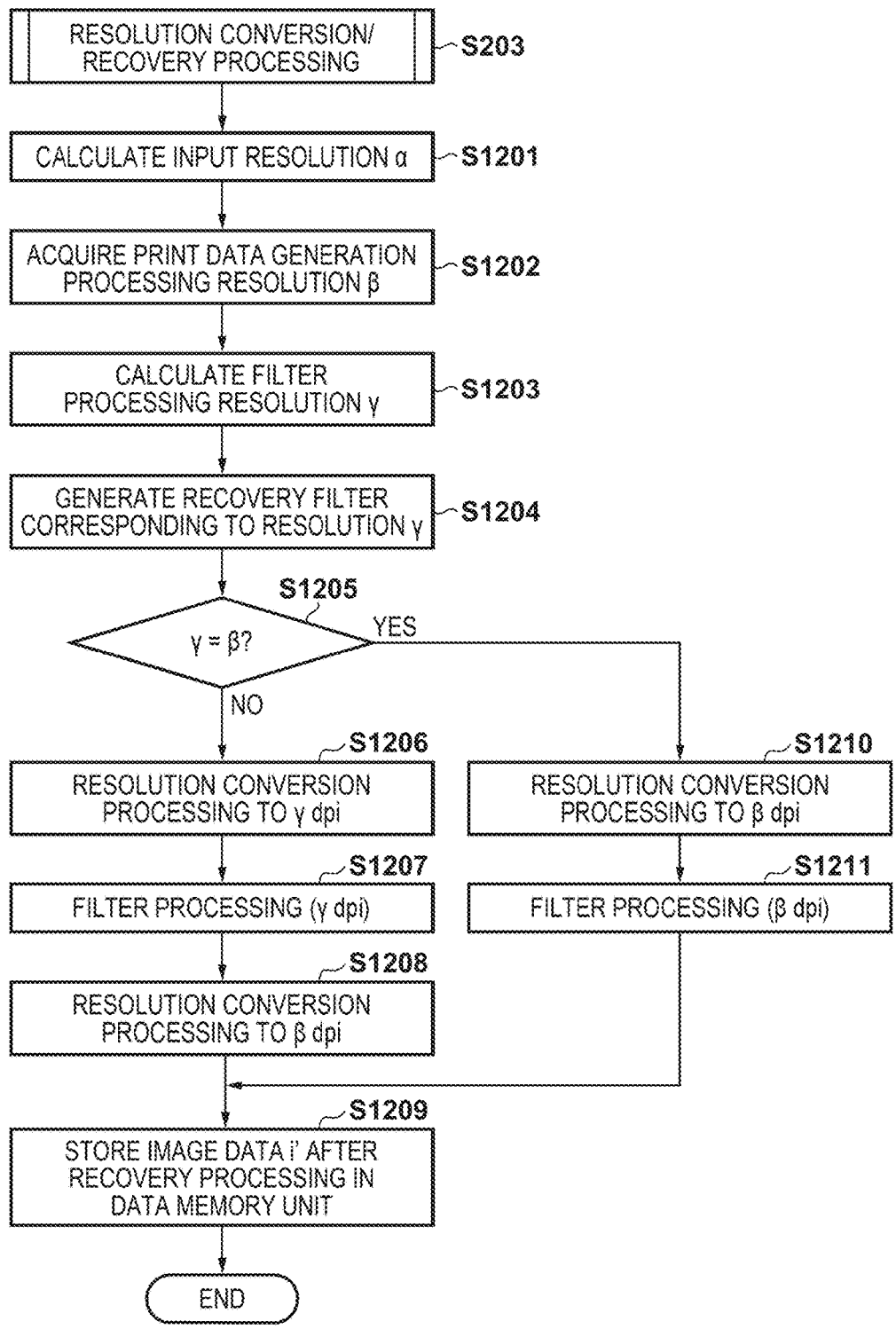

CONVERTING IMAGE DATA FOR PRINTING

BACKGROUND OF THE INVENTION

Field of the Invention

The present invention relates to an apparatus for processing image data, a method, and a storage medium storing a program.

Description of the Related Art

The sharpness of an output image of an image forming apparatus is known to be decreased by the displacement of an ink landing position, an ink smear, an optical blur (optical dot gain), or the like. At this time, if the frequency characteristic of the decrease in the sharpness of the output image can be acquired, the decrease in the sharpness of the output image can be canceled by filter processing using a filter (sharpness recovery filter) with an inverse characteristic.

To output input image data in an intended size, resolution conversion processing of converting the image size into a size suitable for output in the designated size may be performed in any one of processing steps from image data input by the user to output by a printer.

When performing the resolution conversion processing, if the resolution conversion processing is performed after filter processing, a moiré is readily generated. Japanese Patent Laid-Open No. 2002-247346 describes a method of performing filter processing after resolution conversion processing to suppress generation of a moiré.

In Japanese Patent Laid-Open No. 2002-247346, however, since filter processing is performed after resolution conversion processing, a processing time for the filter processing is needed according to the output size and the resolution after the resolution conversion processing. The processing time does not depend on the input image data. That is, even if input image data is the same, a longer processing time is necessary for filter processing as the output size setting becomes large.

SUMMARY OF THE INVENTION

An aspect of the present invention is to eliminate the above-mentioned problems with the conventional technology. The present invention provides an apparatus for efficiently executing filter processing to compensate for degradation in image quality, a method, and a storage medium storing a program.

The present invention in one aspect provides an apparatus for processing image data, comprising: an image data acquisition unit configured to acquire image data; a decision unit configured to decide, based on a resolution of the image data acquired by the image data acquisition unit and a target resolution as a target after resolution conversion, a first resolution higher than the resolution of the image data and closest to the resolution of the image data out of divisors of the target resolution; a first resolution conversion unit configured to convert the image data acquired by the image data acquisition unit into first image data having the first resolution decided by the decision unit; a filter processing unit configured to process the first image data converted by the first resolution conversion unit using a filter configured to compensate for degradation in quality of an image represented by the image data, which can occur when the image data is processed; a second resolution conversion unit configured to convert the first image data processed by the filter processing unit into second image data having the target resolution; and an output unit configured to output the second image data converted by the second resolution conversion unit.

Further features of the present invention will become apparent from the following description of exemplary embodiments with reference to the attached drawings.

BRIEF DESCRIPTION OF THE DRAWINGS

FIG. 12 is a flowchart showing resolution conversion and recovery processing.

DESCRIPTION OF THE EMBODIMENTS

Figure 1:
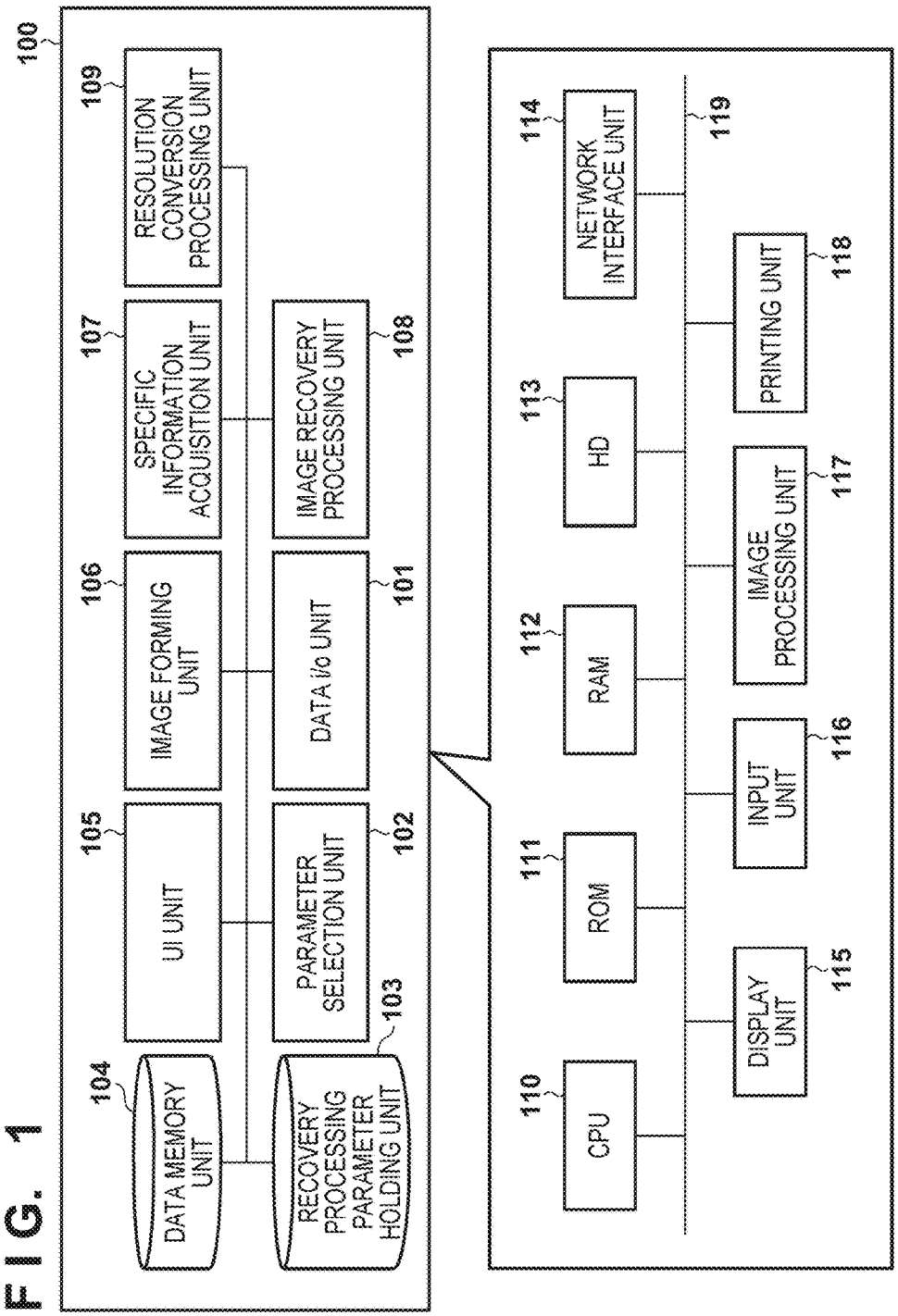
FIG. 1 is a block diagram showing the arrangement of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

[First Embodiment]

FIG. 1 is a block diagram showing the arrangement of an image forming apparatus 100. The lower part of FIG. 1 shows the block diagram of the hardware arrangement of the image forming apparatus 100, and the upper part of FIG. 1 shows the block diagram of the software configuration of the image forming apparatus 100. In this embodiment, the image forming apparatus 100 is a printing apparatus that prints an image or the like on a printing medium such as printing paper. However, the image forming apparatus 100 may be a so-called multi-function peripheral that integrates a plurality of functions such as a printing function, a scanning function, and a facsimile function.

As shown in FIG. 1, the image forming apparatus 100 includes a CPU 110, a ROM 111, a RAM 112, a hard disk (HD) 113, and a network interface unit 114. The image forming apparatus 100 also includes a display unit 115, an input unit 116, an image processing unit 117, and a printing unit 118.

The CPU 110 generally controls the image forming apparatus 100 and executes each executable function. The ROM 111 is a general-purpose ROM and stores, for example, control programs, various kinds of data, and the like necessary for the image forming apparatus 100 to operate. The RAM 112 is a general-purpose RAM and operates as, for example, the work memory of the CPU 110. The operation of each embodiment to be described below is implemented when, for example, the CPU 110 loads a program stored in the ROM 111 to the RAM 112 and executes it. The hard disk (HD) 113 is a general-purpose hard disk and stores, for example, data, tables, and the like used to correct image data in accordance with the characteristic of the image forming apparatus 100.

The network interface unit 114 enables communication with an external apparatus via a network such as a LAN. The network may be a wired network or a wireless network. For a wireless network, the network interface unit 114 includes an interface configuration corresponding to each wireless communication distance. For example, the network interface unit 114 may include a configuration corresponding to near field communication of a communication distance of about 5 cm.

The display unit 115 is, for example, a display and displays the device state of the image forming apparatus 100, job progress information, the setting screens of functions executable by the image forming apparatus 100, and the like. The input unit 116 includes, for example, hardware keys, and accepts a user operation. A touch panel displayed on the display unit 115 may accept the user operation.

The image processing unit 117 executes various kinds of image processing for image data of a processing target. For example, the image processing unit 117 converts image data into binary data corresponding to discharge/nondischarge of an ink droplet. In addition to the binarization processing, the image processing unit 117 executes processing such as color space conversion, HV conversion, gamma correction, and image rotation/reduction/enlargement. The image processing unit 117 is formed from, for example, a chip such as an FPGA. The image processing unit 117 may be formed from a plurality of chips corresponding to the processes.

The printing unit 118 includes the mechanism of a so-called printer engine. For example, when the image forming apparatus 100 performs printing using an inkjet printing method, the printing unit 118 includes a printhead, a carriage driving mechanism, a controller that performs ink discharge control, and the like.

The above-described units are connected by a system bus 119 so as to be communicable with each other. If the image forming apparatus 100 is a multi-function peripheral, it may further include blocks corresponding to the functions. For example, a scanner unit including the arrangement of a scanner engine may be connected to the system bus 119.

In the image forming apparatus 100, the CPU 110 implements the functional blocks of a data i/o unit 101, a parameter selection unit 102, and a recovery processing parameter holding unit 103 by, for example, executing a program. The CPU 110 also implements the functional blocks of a data memory unit 104, a user interface (UI) unit 105, an image forming unit 106, a specific information acquisition unit 107, an image recovery processing unit 108, and a resolution conversion processing unit 109 by, for example, executing a program. The CPU 110 may implement another functional block (not shown in FIG. 1) in accordance with an executable function of the image forming apparatus 100.

The data i/o unit 101 controls data to be transmitted/received to/from an external apparatus via the network interface unit 114. Here, the external apparatus is, for example, a host computer that transmits a job, data, and the like to the image forming apparatus 100. The parameter selection unit 102 acquires a recovery filter held by the recovery processing parameter holding unit 103 implemented on a storage area of the ROM 111, the HD 113, or the like and used to compensate for a decrease in the sharpness of an output image. The recovery processing parameter holding unit 103 is implemented on a storage area of the ROM 111, the HD 113, or the like and holds the recovery filter. The recovery filter will be described later.

The data memory unit 104 is implemented on a storage area of the ROM 111, the HD 113, or the like and stores image data of a processing target of the image forming apparatus 100. The UI unit 105 accepts output conditions necessary for the image forming unit 106 to form an image via a user operation for the input unit 116 corresponding to a setting item on a setting screen displayed on the display unit 115. Here, the output conditions are the printing conditions of the printing unit 118 and include, for example, the number of printing passes, the carriage speed, the printing direction (bidirectional printing or unidirectional printing), a halftone pattern, the distance between the printhead and a printing medium, the presence/absence of use of clear ink, color settings, and the type of a printing medium.

The image forming unit 106 includes blocks shown in FIG. 5 to be described later.

The specific information acquisition unit 107 acquires the output conditions of the image forming unit 106 from the UI unit 105. The image recovery processing unit 108 executes filter processing by a recovery filter for image data of a processing target. The resolution conversion processing unit 109 executes resolution conversion processing for image data.

FIG. 1 shows an example in which the blocks shown in the upper part and the lower part are constituted in a single apparatus as the image forming apparatus 100. However, they may be implemented as a plurality of apparatuses. For example, a system may be constructed in which blocks other than the printing unit 118 are constituted in a host computer that controls the image forming apparatus 100, and an arrangement including the printing unit 118 serves as the image forming apparatus 100.

Figure 2:
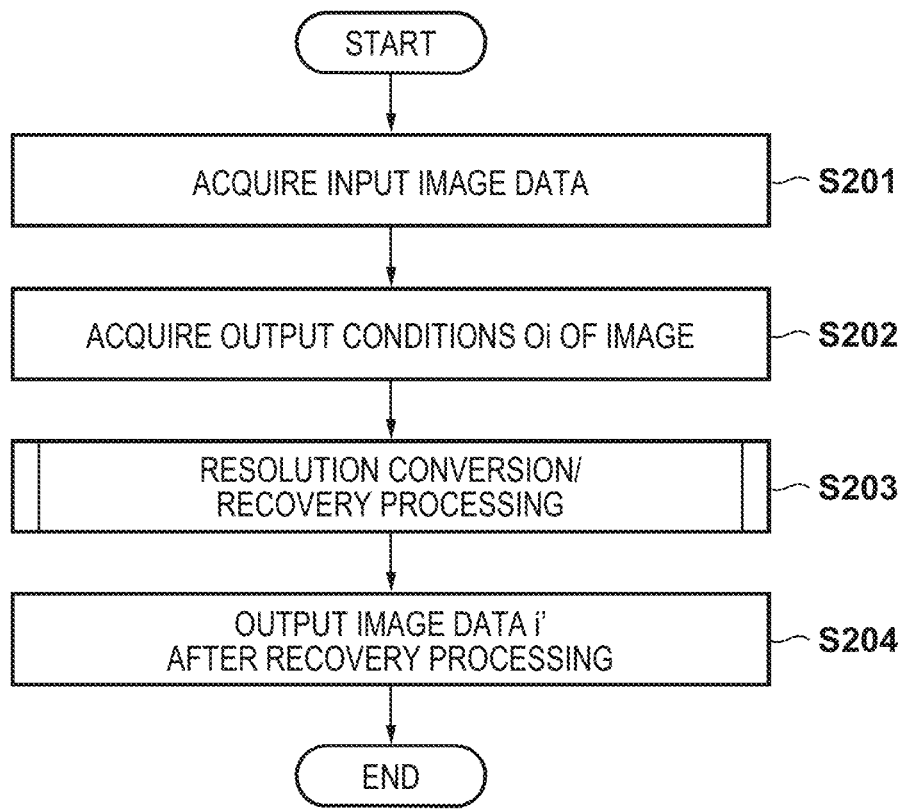
FIG. 2 is a flowchart showing image forming processing.

FIG. 2 is a flowchart showing resolution conversion/recovery processing of the image forming apparatus 100. The processing shown in FIG. 2 is implemented when, for example, the CPU 110 loads a program stored in the ROM 111 to the RAM 112 and executes it.

In step S201, the image recovery processing unit 108 acquires image data of a processing target via the data i/o unit 101 or image data created by an application executed on the image forming apparatus 100, and stores it in the data memory unit 104. The image data of the processing target will be referred to as input image data i hereinafter. As for a method of acquiring image data, image data may be generated by the image forming apparatus 100 or received from an external memory or an external apparatus.

In step S202, the input unit 116 accepts a user operation via a print setting screen. The specific information acquisition unit 107 acquires output conditions Oi of the image forming unit 106 via the UI unit 105 as specific information (condition acquisition). Here, the output conditions Oi include, for example, the number of printing passes, the carriage speed, the printing direction (bidirectional printing or unidirectional printing), a halftone (HT) pattern, the distance between the printhead and a printing medium, the presence/absence of use of clear ink, color settings, and the type of a printing medium, as described above. The output conditions Oi also include a condition that directly reflects a setting by the user and a condition newly set based on a setting by the user.

In step S203, the resolution conversion processing unit 109 executes resolution conversion processing for the input image data i based on the output conditions Oi such that the image forming unit 106 can form an image in an appropriate output size. The image recovery processing unit 108 executes filter processing using a recovery filter for the input image data i, thereby generating image data i' after recovery processing. The image recovery processing unit 108 may execute filter processing using a recovery filter for the input image data i that has undergone resolution conversion, thereby generating the image data i' after recovery processing. Resolution conversion may be performed after filter processing using a recovery filter is executed. The image recovery processing unit 108 stores the generated image data i' after recovery processing in the data memory unit 104. Details of the process of step S203 will be described later.

In step S204, based on the output conditions Oi, the image forming unit 106 reads out the image data i' after recovery processing from the data memory unit 104, and forms an image on a printing medium based on the image data i' after recovery processing. After the process of step S204, the processing shown in FIG. 2 ends.

The components such as the resolution conversion processing unit 109, the image recovery processing unit 108, and the data memory unit 104 necessary for performing processing up to step S203 may be provided on a host computer, and the image forming unit 106 may be provided on a printing apparatus. In this case, the image data i' after recovery processing is first output to the image forming unit of the printing apparatus in step S204, and processing to be described later with reference to FIG. 5 is performed.

The filter processing of step S203 is executed for the luminance value or brightness of the image, and as a result, a change in the tint of the output image based on the original image data is suppressed. However, the filter processing of step S203 may be executed for other parameters, for example, RGB or CMYK.

The arrangement of the printing unit 118 will be described here.

Figure 4:
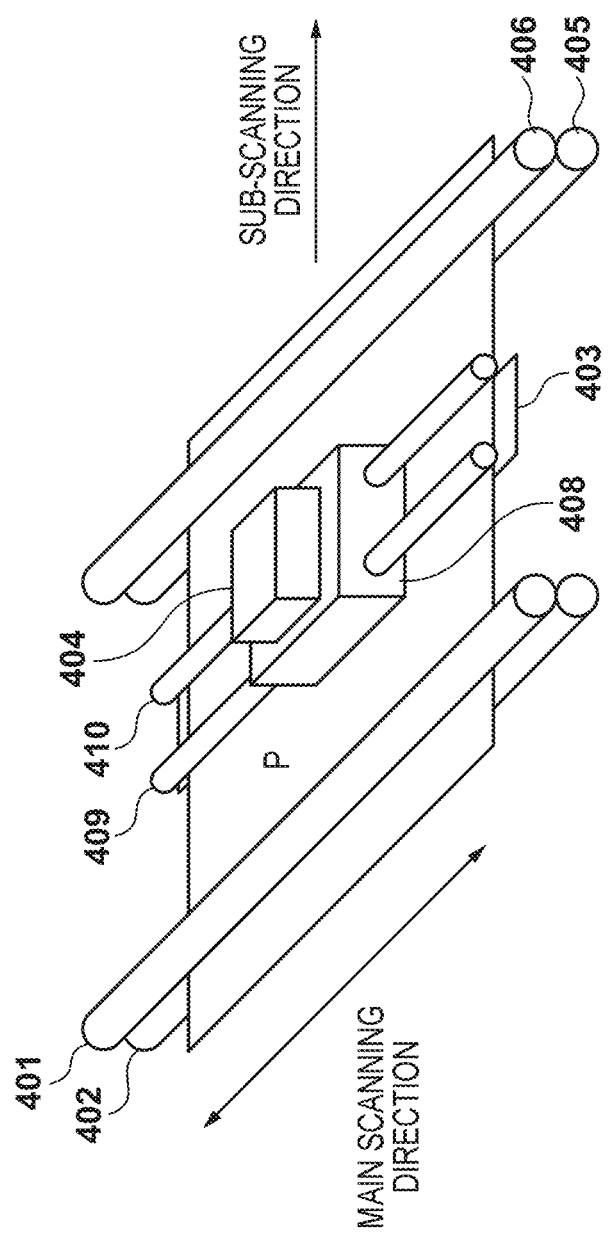
FIG. 4 is a perspective view showing the arrangement of a printing unit.

FIG. 4 is a perspective view showing the arrangement of the printing unit 118. A printing medium P is fed by an automatic feeder (not shown) using a feed motor as a driving source to a nip portion constructed by a conveyance roller 401 arranged on the conveyance path and a pinch roller 402 driven by the conveyance roller 401. After that, the printing medium P is intermittently conveyed in the sub-scanning direction (conveyance direction) crossing the main scanning direction shown in FIG. 4 by the pair of the conveyance roller 401 and the pinch roller 402 and the pair of a discharge roller 405 and a pinch roller 406. A platen 403 is provided along the conveyance path facing the ink droplet discharge surface of a printhead 404. The printing medium P printed by the printing unit on the platen 403 is conveyed in the sub-scanning direction by the pair of the discharge roller 405 and the pinch roller 406 and discharged to a discharge tray (not shown).

The printhead 404 is detachably mounted on a carriage 408. The carriage 408 can be moved reciprocally in the main scanning direction along two guide rails 409 and 410 by the driving force of a carriage motor. In the process of movement, the printhead 404 discharges ink droplets onto the printing medium based on print data, thereby performing printing. Print scanning by the printhead 404 provided with nozzles configured to discharge ink droplets and the printing medium conveyance operation are alternately repeated, and an image is formed stepwise on the printing medium P.

Although not illustrated in FIG. 4, an optical sensor that reads the image printed on the printing medium P is constituted on the bottom surface of the carriage 408. The optical sensor includes, for example, an LED light source and a photodiode that defects reflected light from the printing medium. After the image is printed on the printing medium P by the above-described operation, the CPU 110 rotates the conveyance roller 401 and the discharge roller 405 in reverse directions, thereby returning the printing medium P to the platen 403 in a direction reverse to that in printing. The CPU 110 then moves the carriage 408 in the main scanning direction, thereby causing the optical sensor to acquire brightness (luminance) on the printing medium P.

Figure 5:
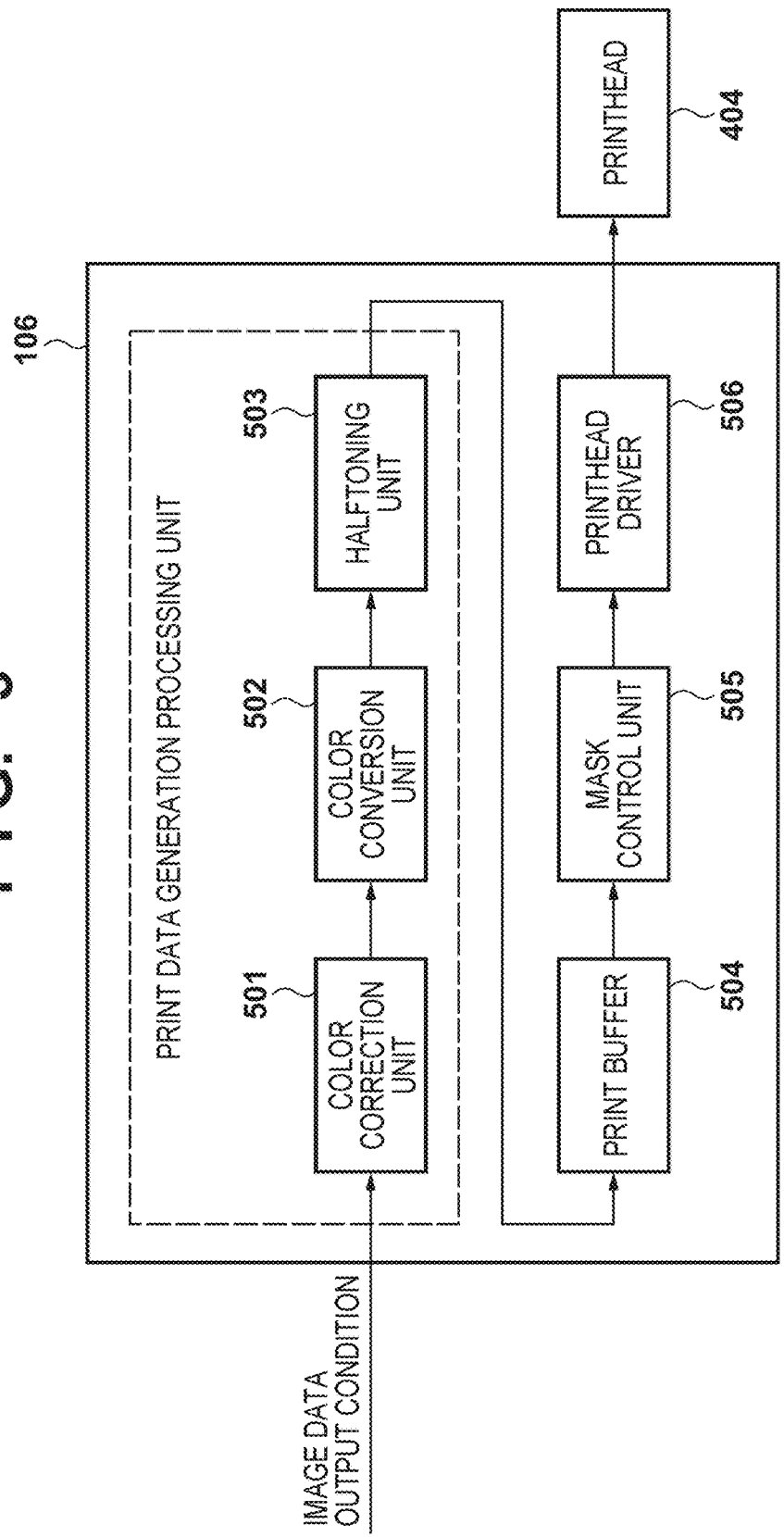
FIG. 5 is a block diagram for explaining image forming processing by an image forming unit.

FIG. 5 is a block diagram for explaining image forming processing by the image forming unit 106. Image forming processing by the image forming unit 106 includes processes in a print data generation processing unit and the processes of a print buffer 504, a mask control unit 505, a printhead driver 506, and the printhead 404. Here, the processes in the print data generation processing unit include the processes of a color correction unit 501, a color conversion unit 502, and a halftoning unit 503. Image forming processing to be described below is executed based on the output conditions Oi and the image data i' after recovery processing input to the image forming unit 106 in step S204 of FIG. 2, thereby forming an image on the printing medium P. A description will be made below assuming input image data is the image data i' after recovery processing. However, it may be image data that has not undergone the recovery processing.

In the image forming unit 106, the color correction unit 501 performs, for the input image data, color correction according to an image characteristic to be output. The color conversion unit 502 converts the RGB signals of the image data that has undergone the color correction to signals corresponding to ink colors to be used by the image forming unit 106. In this embodiment, the image data is converted into signals corresponding to, for example, a total of eight ink colors, that is, cyan (C), magenta (M), yellow (Y), black (Bk), light cyan (LC), light magenta (LM), gray (Gy), and light gray (LGy). The halftoning unit 503 performs pseudo halftoning processing such as error diffusion for the input multilevel signal of each ink color, thereby converting the multilevel signal into a signal of tones necessary for the image forming unit 106 to implement a printing operation, that is, a binary signal per bit. Parameters to be used by the color correction unit 501, the color conversion unit 502, and the halftoning unit 503 are decided based on the output conditions Oi.

The print buffer 504 receives the binary print data that has undergone the halftoning processing, and transfers it to the mask control unit 505 such that print data of one scanning corresponds to each printing element of the printhead 404.

The mask control unit 505 performs mask processing for the input binary print data using a mask pattern decided based on the output conditions Oi. The binary print data thinned by the mask processing is transferred to the printhead driver 506 and converted into an electric signal to drive each printing element (nozzle) of the printhead 404.

The electric signal generated by the printhead driver 506 is transferred to each printing element of the printhead 404 at a predetermined timing. Each printing element thus discharges an ink droplet in accordance with the electric signal. Print scanning and the conveyance operation as described above are alternately repeated based on the output conditions Oi, thereby forming an image. In this embodiment, in a multipass printing method of scanning a unit printing region on the printing medium a plurality of times, the printhead 404 discharges ink droplets based on the print data thinned by the mask processing in each scanning.

[Resolution Conversion/Recovery Processing]

The image size (number of pixels) of the input image data i to the image forming apparatus 100 is arbitrarily set. The output size (inch) is also arbitrarily set. That is, the resolution (input resolution) of the input image data i corresponding to the output size is not uniquely decided. A data resolution sent to the image forming unit 106 and processed by the print data generation processing unit shown in FIG. 5 is uniquely decided based on the type of the printing medium or the setting of print quality. The data resolution processed by the print data generation processing unit of the image forming unit 106 will be referred to as a "print data generation processing resolution" hereinafter. In this embodiment, the print data generation processing resolution is the resolution of image data when it is input to the color correction unit 501 shown in FIG. 5. The resolution may be further raised by print data generation processing later based on a resolution according to the print resolving capability of the device such as the nozzle pitch of the printhead. Resolution conversion executed in step S203 needs to be executed using various enlargement ratios or reduction ratios based on the input resolution and the print data generation processing resolution.

In this embodiment, resolution conversion and recovery processing are controlled based on an input resolution, thereby reducing the processing time needed for filter processing while improving image quality by the filter processing. Note that in this embodiment, the printing medium is set to glossy paper as an output condition Oi. In addition, print quality is set to a high resolution mode as an output condition Oi. The print data generation processing resolution is assumed to be 1,200 dpi. Recovery filters for 300 dpi, 600 dpi, and 1,200 dpi that are divisors of the print data generation processing resolution of 1,200 dpi are prepared and held in the recovery processing parameter holding unit 103 in advance. FIG. 8B is a graph showing the frequency characteristics of the three types of recovery filters described above. As shown in FIG. 8B, the frequency characteristics of the recovery filters for 300 dpi, 600 dpi, and 1,200 dpi partially overlap the frequency characteristic of the recovery filter for 1,200 dpi.

Figure 3:
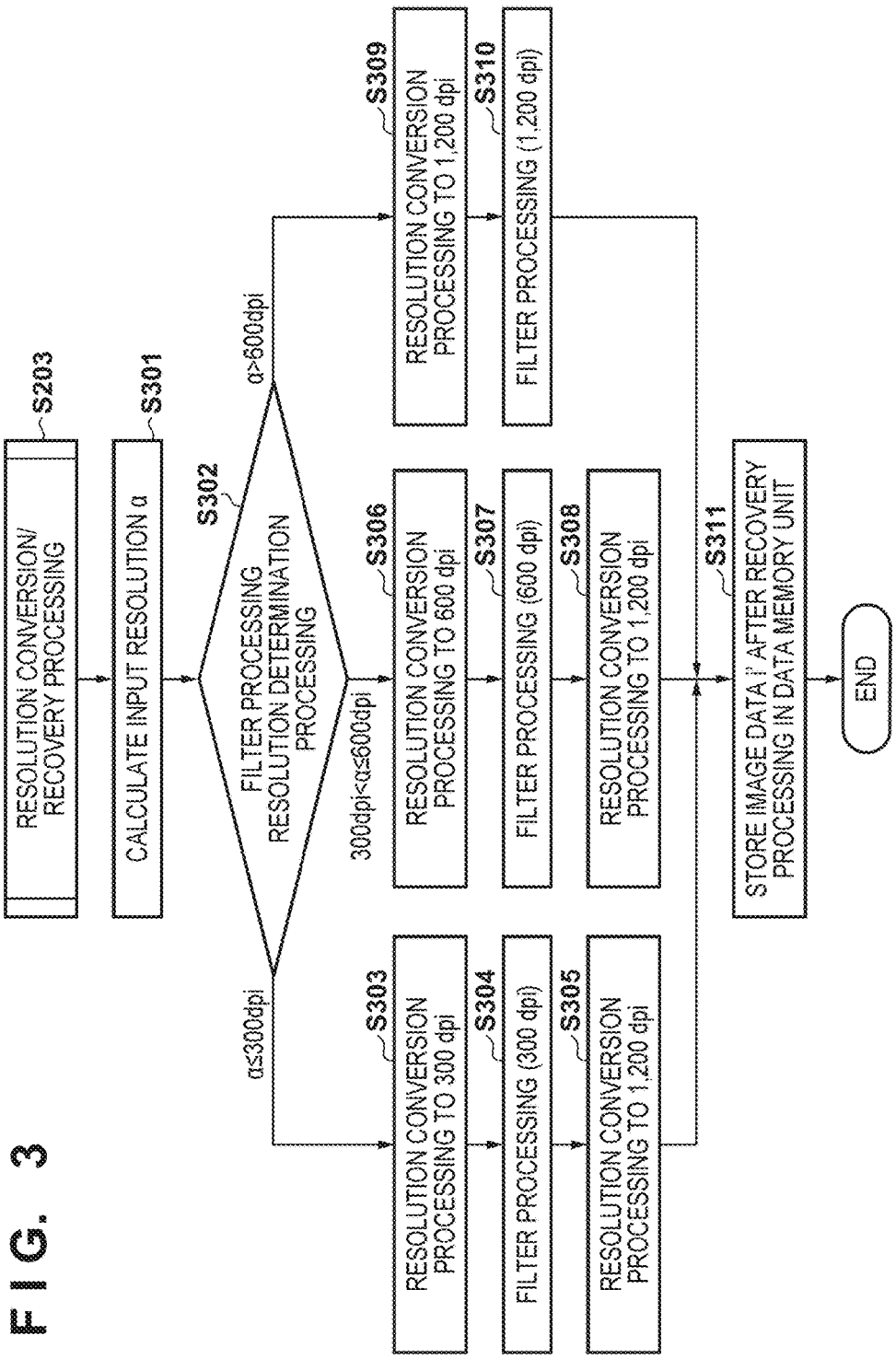
FIG. 3 is a flowchart showing resolution conversion and recovery processing.

FIG. 3 is a flowchart showing resolution conversion/recovery processing. The processing shown in FIG. 3 is implemented when, for example, the CPU 110 loads a program stored in the ROM 111 to the RAM 112 and executes it.

In step S301, the resolution conversion processing unit 109 calculates an input resolution α from the number of pixels (the numbers of pixels in the vertical and horizontal directions) of the input image data i and the output size. The input resolution α is calculated by $$\alpha = Nx/Lx \text{ or } \alpha = Ny/Ly \quad (1)$$

where Nx is the numbers of pixels of the input image in the horizontal direction, Ny is the numbers of pixels of the input image in the vertical direction. In addition, Lx is the output size (inch) in the horizontal direction, Ly is the output size (inch) in the vertical direction.

For example, if the number of pixels of the input image data i is 6000 pixels (horizontal)×4000 pixels (vertical), and the output size is 15 inches (horizontal)×10 inches (vertical), the input resolution α is 400 dpi.

Next, in step S302, the resolution conversion processing unit 109 performs processing of determining the resolution to undergo recovery processing. If the input resolution α is 300 dpi, the process advances to step S303. In step S303, the resolution conversion processing unit 109 executes resolution conversion processing for the input image data i such that the resolution becomes 300 dpi. That is, a resolution higher than the input resolution α and closest to the input resolution α is decided out of 300 dpi, 600 dpi, and 1,200 dpi that are divisors of the print data generation processing resolution of 1,200 dpi, and the resolution is converted into the decided resolution.

In step S304, the image recovery processing unit 108 acquires the recovery filter for 300 dpi from the recovery processing parameter holding unit 103, and executes filter processing for the resolution-converted input image data i using the recovery filter for 300 dpi. In step S305, the resolution conversion processing unit 109 executes resolution conversion processing for the filtered input image data i such that the resolution becomes 1,200 dpi, thereby generating the image data i' after recovery processing. After the process of step S305, the process advances to step S311.

The method of resolution conversion in step S305 is not particularly limited. For example, to reduce degradation in sharpness, a nearest neighbor method may be used. Additionally, the resolution conversion processing executed in step S305 is enlargement processing by an integer multiple from 300 dpi to 1,200 dpi. Since all pixels are enlarged at the same ratio, generation of a moiré can be reduced.

If the input resolution α ranges from 300 dpi (exclusive) to 600 dpi (inclusive) in step S302, the process advances to step S306. In step S306, the resolution conversion processing unit 109 executes resolution conversion processing for the input image data i such that the resolution becomes 600 dpi. That is, a resolution higher than the input resolution α and closest to the input resolution α is decided out of 300 dpi, 600 dpi, and 1,200 dpi that are divisors of the print data generation processing resolution of 1,200 dpi, and the resolution is converted into the decided resolution.

In step S307, the image recovery processing unit 108 acquires the recovery filter for 600 dpi from the recovery processing parameter holding unit 103, and executes filter processing for the resolution-converted input image data i using the recovery filter for 600 dpi. In step S308, the resolution conversion processing unit 109 executes resolution conversion processing for the filtered input image data i such that the resolution becomes 1,200 dpi, thereby generating the image data i' after recovery processing. After the process of step S308, the process advances to step S311.

The method of resolution conversion in step S308 is not particularly limited. For example, to reduce degradation in sharpness, a nearest neighbor method may be used. Additionally, the resolution conversion processing executed in step S308 is enlargement processing by an integer multiple from 600 dpi to 1,200 dpi. Since all pixels are enlarged at the same ratio, generation of a moiré can be reduced.

If the input resolution α is higher than 600 dpi, the process advances to step S309. In step S309, the resolution conversion processing unit 109 executes resolution conversion processing for the input image data i such that the resolution becomes 1,200 dpi. That is, a resolution higher than the input resolution α and closest to the input resolution α is decided out of 300 dpi, 600 dpi, and 1,200 dpi that are divisors of the print data generation processing resolution of 1,200 dpi, and the resolution is converted into the decided resolution. Note that as shown in FIG. 3, whether to perform resolution conversion after filter processing changes depending on whether the input resolution α is equal to or less than a predetermined value (for example, 600 dpi or less) or more than the predetermined value.

In step S310, the image recovery processing unit 108 acquires the recovery filter for 1,200 dpi from the recovery processing parameter holding unit 103. Then, the image recovery processing unit 108 executes filter processing for the resolution-converted input image data i using the recovery filter for 1,200 dpi, thereby generating the image data i' after recovery processing. After the process of step S310, the process advances to step S311.

In step S311, the resolution conversion processing unit 109 or the image recovery processing unit 108 stores the image data i' after recovery processing in the data memory unit 104, and ends the processing shown in FIG. 3. The resolution of 1,200 dpi in FIG. 3 is an example of a target resolution as the target after resolution conversion.

The effect of this embodiment will be described using an example in which the input image data has input resolution α=250 dpi while comparing the following three cases.
(1) This embodiment
(2) A case in which resolution conversion to the print data generation processing resolution of 1,200 dpi is performed, and then, filter processing is applied
(3) A case in which filter processing is executed for the image data of 250 dpi, and then, resolution conversion to the print data generation processing resolution of 1,200 dpi is performed Cases (1) to (3) are compared from the viewpoint of the filter processing time and image quality.

In case (1), since the input resolution α is 250 dpi, the processes of steps S302, S303, S304, S305, and S311 in FIG. 3 are executed. That is, for the input image data, resolution conversion to 300 dpi is performed, and filter processing is then executed. After that, resolution conversion to 1,200 dpi is performed. In case (1), since the resolution conversion from 300 dpi to 1,200 dpi is resolution conversion by an integer multiple, moiré is hardly generated, and the effect of improving image quality by filter processing is attained.

In case (2), the effect of improving image quality can be obtained as in case (1). However, since filter processing is applied to image data of 1,200 dpi, the number of pixels that need the filter processing is 16 times larger than in case (1), and a processing time about 16 times longer than in case (1) is necessary.

In case (3), since filter processing is applied to image data of 250 dpi, the number of pixels that need the filter processing becomes smaller, and the processing time becomes shorter than in case (1). However, since resolution conversion not by an integer multiple is executed after filter processing, the possibility that moiré is generated, and image quality degrades rises.

As described above, in this embodiment, recovery filters for a plurality of resolutions that are divisors of the print data generation processing resolution decided by the output conditions are held in advance. The input resolution α is calculated based on the number of pixels and the output size of the input image, and resolution conversion and filter processing are appropriately controlled, thereby improving image quality while reducing the processing time.

Note that in this embodiment, three recovery filters for filter processing resolutions of 300 dpi, 600 dpi, and 1,200 dpi are held. However, the resolutions are not limited to these and can arbitrarily be set based on the memory capacity of the image forming apparatus 100 or the like. For example, four recovery filters including a recovery filter for 400 dpi may be held. Alternatively, only two recovery filters for 600 dpi and the 1,200 dpi may be held.

[Recovery Filter Generation]

A recovery filter generation method will be described next. In this embodiment, a different recovery filter is used in accordance with the resolution to undergo filter processing. The recovery filters are created in advance and stored in the recovery processing parameter holding unit 103.

Figure 6:
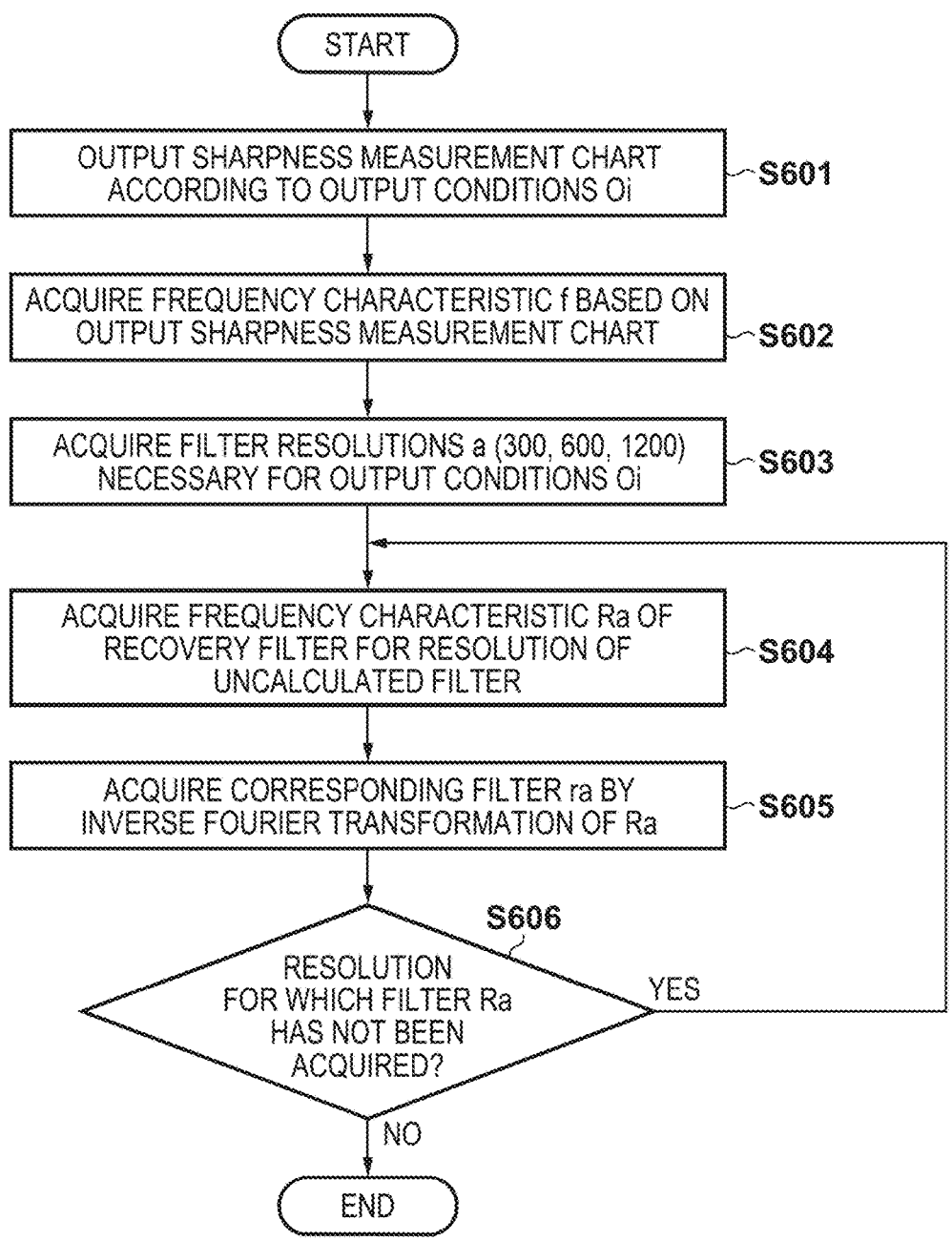
FIG. 6 is a flowchart showing recovery filter generation processing.

FIG. 6 is a flowchart showing recovery filter generation processing. The processing shown in FIG. 6 is implemented when, for example, the CPU 110 loads a program stored in the ROM 111 to the RAM 112 and executes it.

Figure 7:
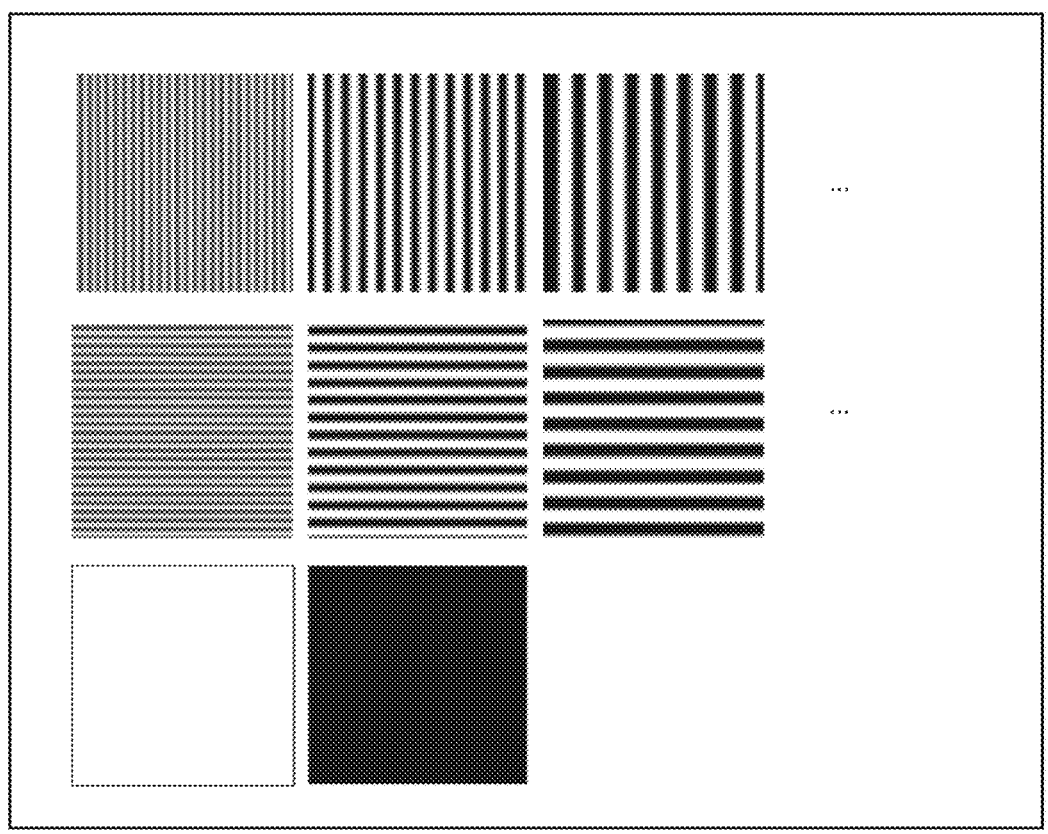
FIG. 7 is a view showing a sharpness measurement chart.

In step S601, the image forming unit 106 acquires the output conditions Oi from a setting screen or the like, and outputs a sharpness measurement chart (test image) according to the output conditions Oi (test printing). The output conditions Oi are, for example, the type of a printing medium and image quality. FIG. 7 is a view showing an example of the sharpness measurement chart. As shown in FIG. 7, the sharpness measurement chart includes an image chart including a plurality of sine wave patterns and even patterns of different frequencies.

The upper part of FIG. 7 shows measurement images that change the brightness in the main scanning direction. The middle part of FIG. 7 shows measurement images that change the brightness in the sub-scanning direction. The lower part of FIG. 7 shows measurement images of even white and black. The sharpness measurement chart shown in FIG. 7 is stored in, for example, the data memory unit 104 on the hard disk 113 or the like.

In step S602, the image forming unit 106 acquires a frequency response value fi(u) corresponding to the output conditions Oi based on the output sharpness measurement chart, where u is the frequency of a sine wave. In recovery filter acquisition, as described with reference to FIG. 4, the frequency response value fi(u) is acquired based on, for example, a reading result obtained by the optical sensor formed on the carriage 408. Alternatively, the frequency response value fi(u) may be acquired by a reading unit (scanner) that is not illustrated in FIG. 1. The frequency response value fi(u) may be acquired using another device such as a camera, a microscope, or a microdensitometer.

As the frequency response value fi, for example, MTF(u) obtained by $$fi(u) = MTF(u) = C(u)/C' \quad (2)$$

where $C(u)=(Max(u)-Min(u))/(Max(u)+Min(u))$, and $C'=(White-Black)/(White+Black)$
is used. In equation (2), Max(u) and Min(u) are the maximum reflectance and the minimum reflectance of the sine wave charts, which change depending on a frequency u. Additionally, in equation (2), White and Black are the reflectances of the even patterns, respectively, in the lower part of FIG. 7.

MTF(u) may be obtained using another equation in place of equation (2). For example, MTF(u) may be obtained by $$fi(u) = MTF(u) = (Max(u)-Min(u))/(White-Black) \quad (3)$$

According to equation (2), in a case in which the average brightness of the output image changes in accordance with the frequency u of the sine wave, the response value is excessively large in a dark portion as compared to a bright portion. Hence, in the case in which the average brightness of the output image changes, equation (3) may be used in place of equation (2). Note that in equations (2) and (3), Max(u) and Min(u), and White and Black are described as reflectances. However, for example, luminance or density, or the RGB values of the device may be used.

The frequency response value fi(u) may be acquired using rectangular wave patterns as the sharpness measurement chart in place of the sine wave patterns. In this case, a CTF value calculated by applying equation (2) to the rectangular wave patterns may be used as the frequency response value fi(u). Alternatively, the CTF value may be converted into an MTF value using the known Coltman's formula and used as the frequency response value fi(u). As the frequency response value fi(u), a subjective evaluation value of sharpness for a frequency pattern may be used.

The frequency response value fi(u) is ideally always 1 independently of the frequency u. However, in, for example, an inkjet printing apparatus, the higher the frequency is, the smaller the frequency response value is in many cases.

In step S603, the resolution conversion processing unit 109 acquires, from the output conditions Oi, resolution information a to undergo filter processing. For example, in this embodiment, a printing resolution of 1,200 dpi is uniquely decided from the output conditions Oi, and three resolutions of 300 dpi, 600 dpi, and 1,200 dpi that are divisors of 1,200 dpi are acquired in step S603.

In step S604, focusing on one of the pieces of resolution information acquired in step S603, the CPU 110 acquires a frequency response value Ra of the recovery filter by $$Ra(u)=1/fi(u) \quad (4)$$

In step S605, the CPU 110 performs inverse Fourier transformation for the frequency response value Ra of the recovery filter, thereby generating and acquiring a recovery filter ra(x).

In this embodiment, the recovery processing of step S203 in FIG. 2 may be performed on a frequency space. In this case, a frequency response value Ra(u) of the recovery filter acquired in step S604 is held as a recovery filter ra(u).

Here, the recovery filter ra(x) or ra(u) has only a discrete value according to the resolution to undergo filter processing. For example, assume a case in which filter processing is executed in a real space using the recovery filter ra(x) for 300 dpi. In this case, image data when executing filter processing is discrete date having a pixel interval of about 84 For this reason, the recovery filter for 300 dpi also needs to be data having an interval of about 84 µm, like the image data.

Assume a case in which filter processing is performed using the recovery filter ra(x) for 1,200 dpi. In this case, image data when executing filter processing is discrete date having a pixel interval of about 21 µm. For this reason, the recovery filter for 1,200 dpi also needs to be data having an interval of about 21 µm, like the image data. In this way, all recovery filters according to the resolution to undergo filter processing need to be calculated and held.

In step S606, the CPU 110 determines whether recovery filters are acquired for all resolutions that need the recovery filters ra. Upon determining that the recovery filters ra are acquired for all resolutions, the processing shown in FIG. 6 ends. On the other hand, upon determining that the recovery filters ra are not acquired for all resolutions, the processing is repeated from step S604.

Figure 8A:
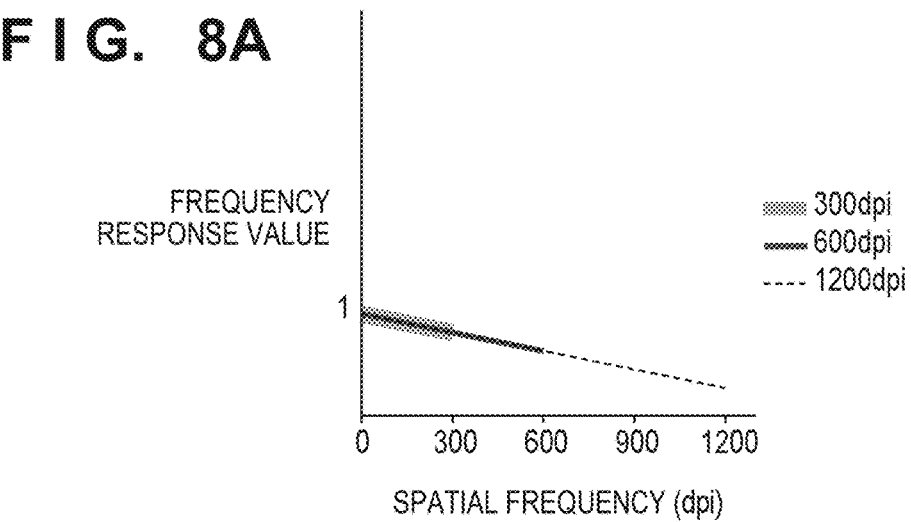
FIGS. 8A to 8C are graphs showing frequency characteristics.
Figure 8B:
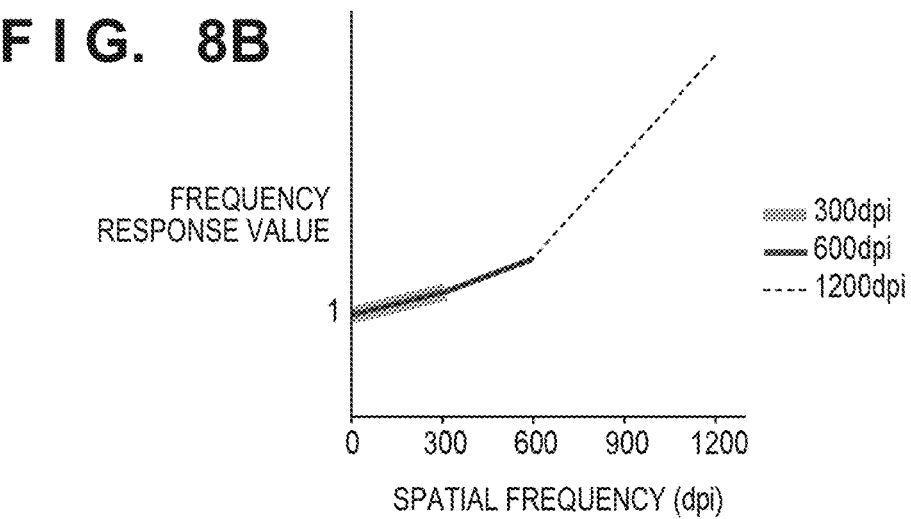
Figure 8C:
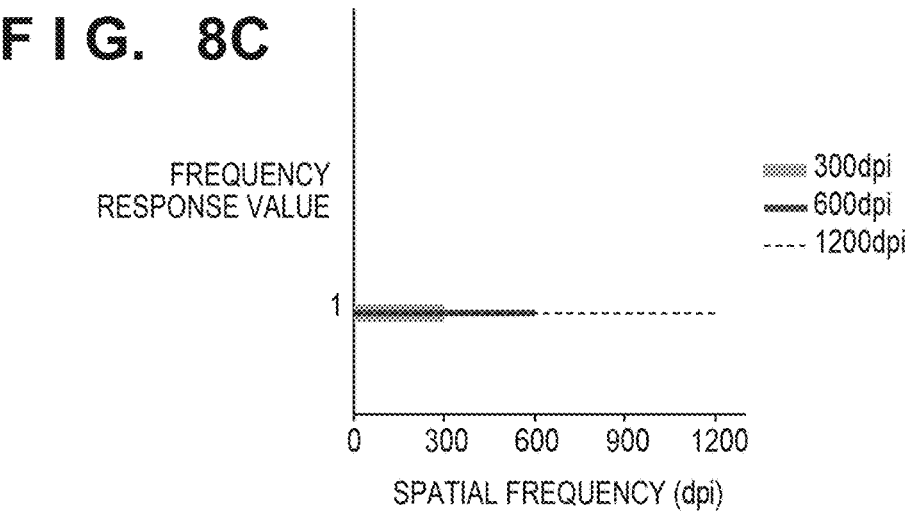

FIGS. 8A to 8C are graphs showing sharpness recovery effects obtained by recovery processing in the branch procedures of the resolution conversion and recovery processing of step S203 in FIG. 2. As examples of the branch procedures, recovery effects for image data having input resolutions of 300, 600, and 1,200 dpi will be described. Note that a spatial frequency along the abscissa, which generally uses a unit "cycles/mm", uses a unit "dpi" in correspondence with the input resolution.

FIG. 8A is a graph showing a frequency characteristic fi of image data in a case in which filter processing is not applied. If filter processing is not applied, as a characteristic, the frequency response value degrades as the frequency becomes higher independently of the input resolution of the image data. In FIG. 8A, the characteristic more than the input resolution is not held.

FIG. 8B is a graph showing the frequency characteristics of recovery filters. To recover the degradation in the frequency characteristic fi shown in FIG. 8A, the frequency characteristic has the shape of the inverse function of the frequency characteristic fi. The recovery filters do not hold the characteristics more than the input resolution, like the frequency characteristic fi.

FIG. 8C is a graph showing the frequency characteristic fi of image data in a case in which filter processing is applied. When filter processing is executed using a recovery filter having a characteristic as the inverse function of the frequency characteristic fi, the degradation in the frequency characteristic equal to or less than the input resolution is recovered under all input resolution conditions, and the frequency response value becomes 1, as compared to the frequency characteristic fi in the case in which filter processing is not applied. As shown in FIG. 8C, the frequency characteristic is recovered in all frequency regions equal to or less than the input resolution, unlike general sharpness processing.

An effect obtained by executing filter processing for the resolution of image data using a recovery filter for a different resolution will be described here. As an example, a case in which the input resolution of the image data is 600 dpi will be described. In this case, the resolution of the image data when applying filter processing is determined to be 600 dpi in step S302. A case in which the recovery filter used in filter processing is a recovery filter for 600 dpi corresponding to the input resolution and a case in which the recovery filter is a recovery filter for 300 or 1,200 dpi that does not correspond to the input resolution will be explained with reference to FIGS. 13A to 13C.

Figure 13A:
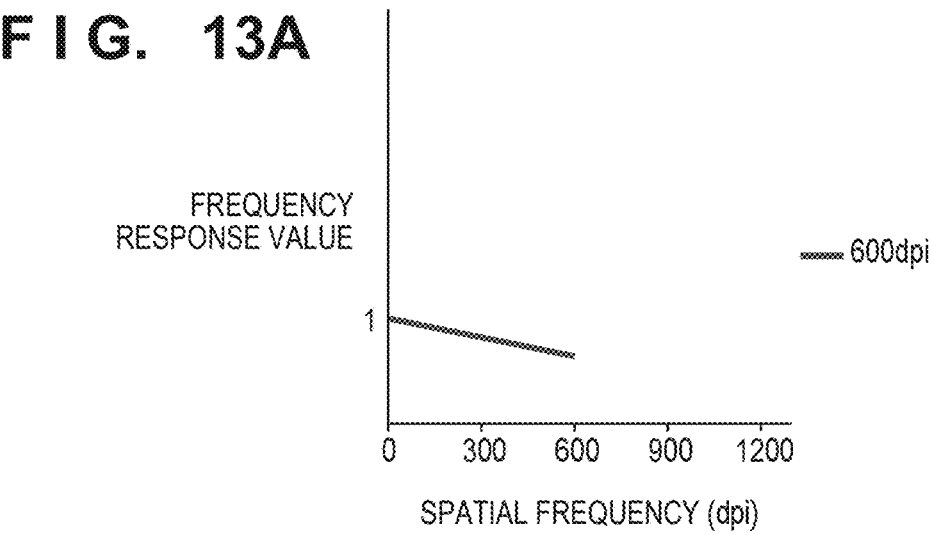
FIGS. 13A to 13C are graphs showing frequency characteristics.

FIG. 13A is a graph showing the frequency characteristic fi of the image data in a case in which filter processing is not applied. The characteristic is the same as in the case of the image data of the input resolution of 600 dpi.

Figure 13B:
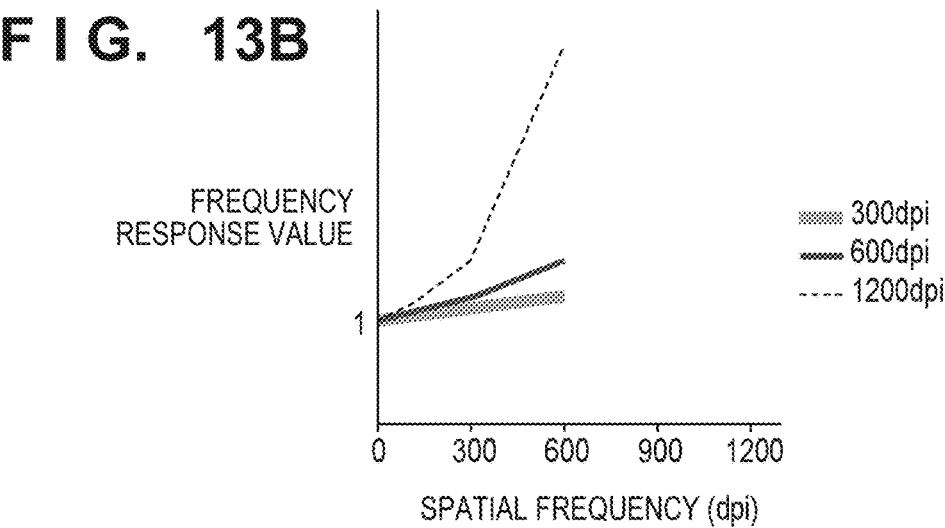

FIG. 13B is a graph showing the frequency characteristics of recovery filters for 300 dpi, 600 dpi, and 1,200 dpi to be applied to the image data of 600 dpi. The frequency characteristic of the recovery filter for 600 dpi is the same as the characteristic shown in FIG. 8B.

When the recovery filter for 300 dpi is applied to the image data of 600 dpi, a recovery filter for a resolution lower than the resolution of the image data is applied. As a result, the frequency characteristic of a recovery filter having a higher response characteristic in a high-frequency region becomes lower than that of the recovery filter for 600 dpi (an optimum recovery filter in this example).

When the recovery filter for 1,200 dpi is applied to the image data of 600 dpi, a recovery filter for a resolution higher than the resolution of the image data is applied. Hence, the frequency characteristic of a recovery filter having a higher response characteristic in a high-frequency region becomes higher than that of the recovery filter for 600 dpi.

Figure 13C:
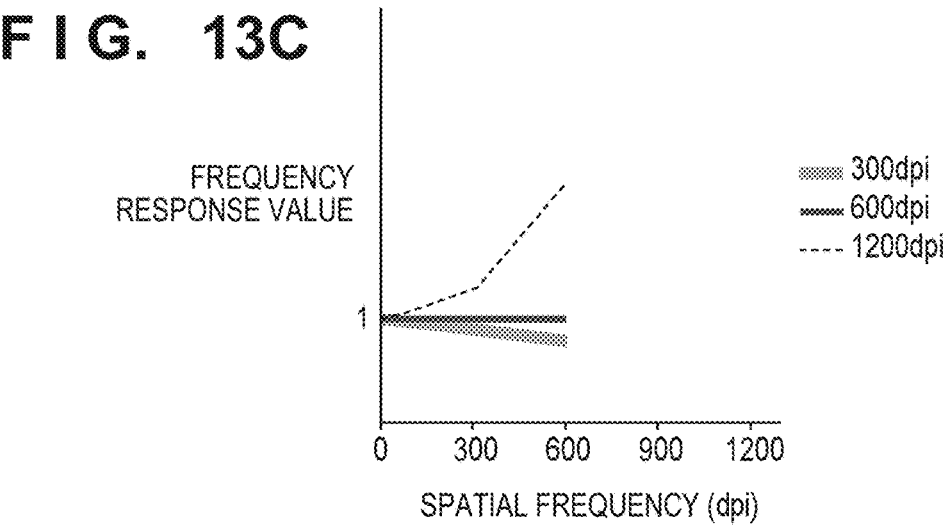

FIG. 13C is a graph showing the frequency characteristic in a case in which filter processing is applied. When the recovery filter for 600 dpi is applied, correct correction is performed, and the degradation in the frequency characteristic can be recovered, as in FIG. 8C. However, if the recovery filter for 300 dpi is applied, the degradation cannot sufficiently be recovered because the frequency characteristic of the recovery filter is low. In addition, if the recovery filter for 1,200 dpi is applied, recovery is excessively performed because the frequency characteristic of the recovery filter is higher than necessary. As described above, appropriate recovery processing cannot be performed unless a recovery filter corresponding to the resolution of image data is used when performing filter processing.

Note that recovery processing performed in the high-frequency region is known to generate noise or decrease brightness. To prevent this, for example, in the region of 4 cycles/mm or more where the sensitivity is low in terms of visual characteristic, the recovery amount may be made small, or recovery may be prohibited.

[Second Embodiment]

In this embodiment, a form in which the processing time is further shortened will be described. Points different from the first embodiment will be described below.

Figure 9:
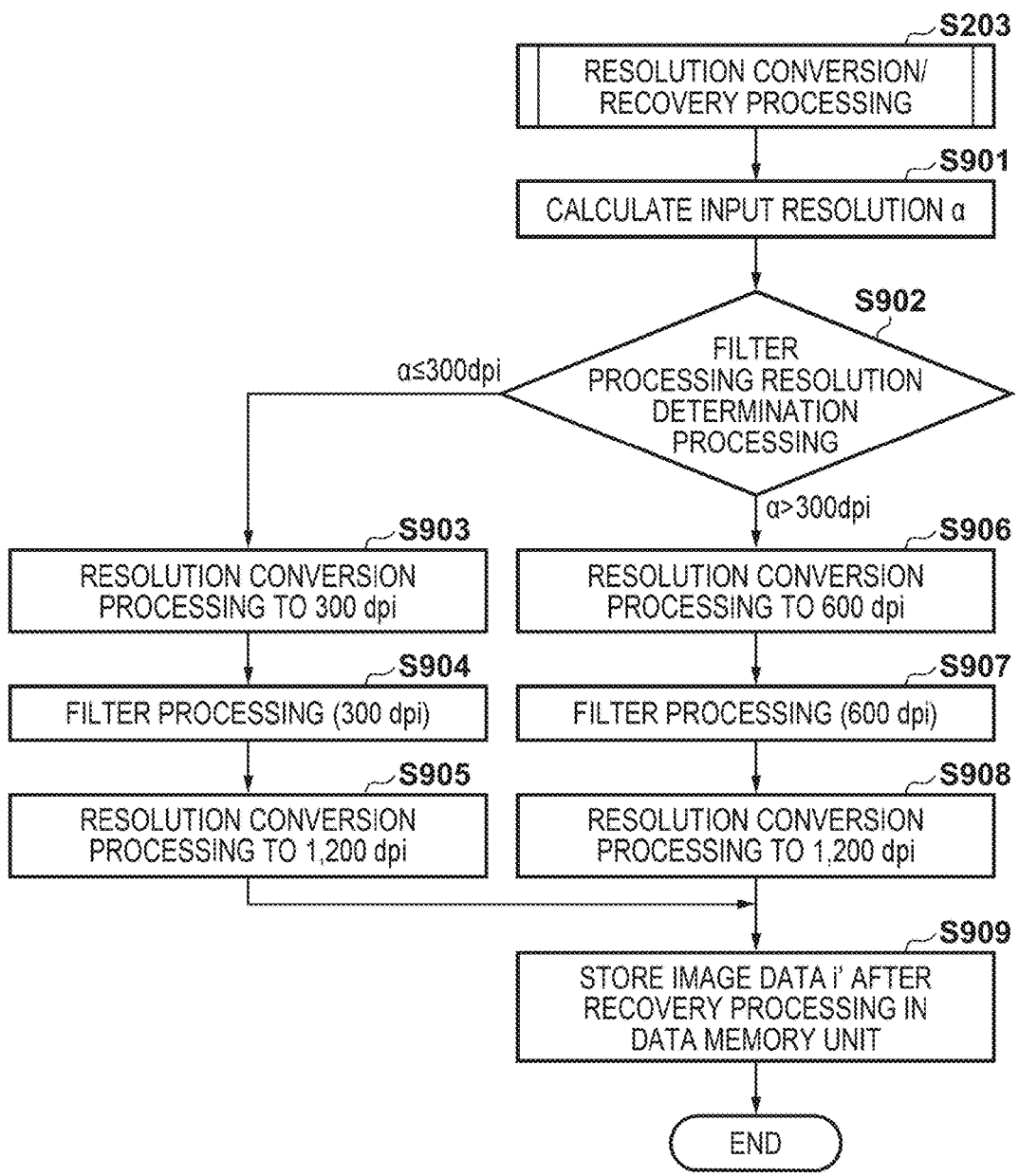
FIG. 9 is a flowchart showing resolution conversion and recovery processing.

FIG. 9 is a flowchart showing resolution conversion and recovery processing according to this embodiment. The processing shown in FIG. 9 is implemented when, for example, a CPU 110 loads a program stored in a ROM 111 to a RAM 112 and executes it. This processing is different from that of the first embodiment in the determination threshold of the resolution to undergo recovery processing in step S902. In the first embodiment, the thresholds of determination are 300 dpi and 600 dpi. In this embodiment, only 300 dpi is used as the determination threshold.

Step S901 is the same as step S301 in FIG. 3.

In step S902, a resolution conversion processing unit 109 performs processing of determining the resolution to undergo recovery processing. In this embodiment, if an input resolution α is 300 dpi or less, the process advances to step S903. If the input resolution α is higher than 300 dpi, the process advances to step S906.

The processes of steps S903 to S905 in a case in which the input resolution α is 300 dpi or less are the same as those of steps S303 to S305 in FIG. 3.

Upon determining in step S902 that the input resolution α is higher than 300 dpi, the process advances to step S906, and the resolution conversion processing unit 109 executes resolution conversion processing for input image data i such that the resolution becomes 600 dpi. At this time, if the input resolution α is higher than 600 dpi, part of the information of the input image data is lost by the resolution conversion.

Figure 10:
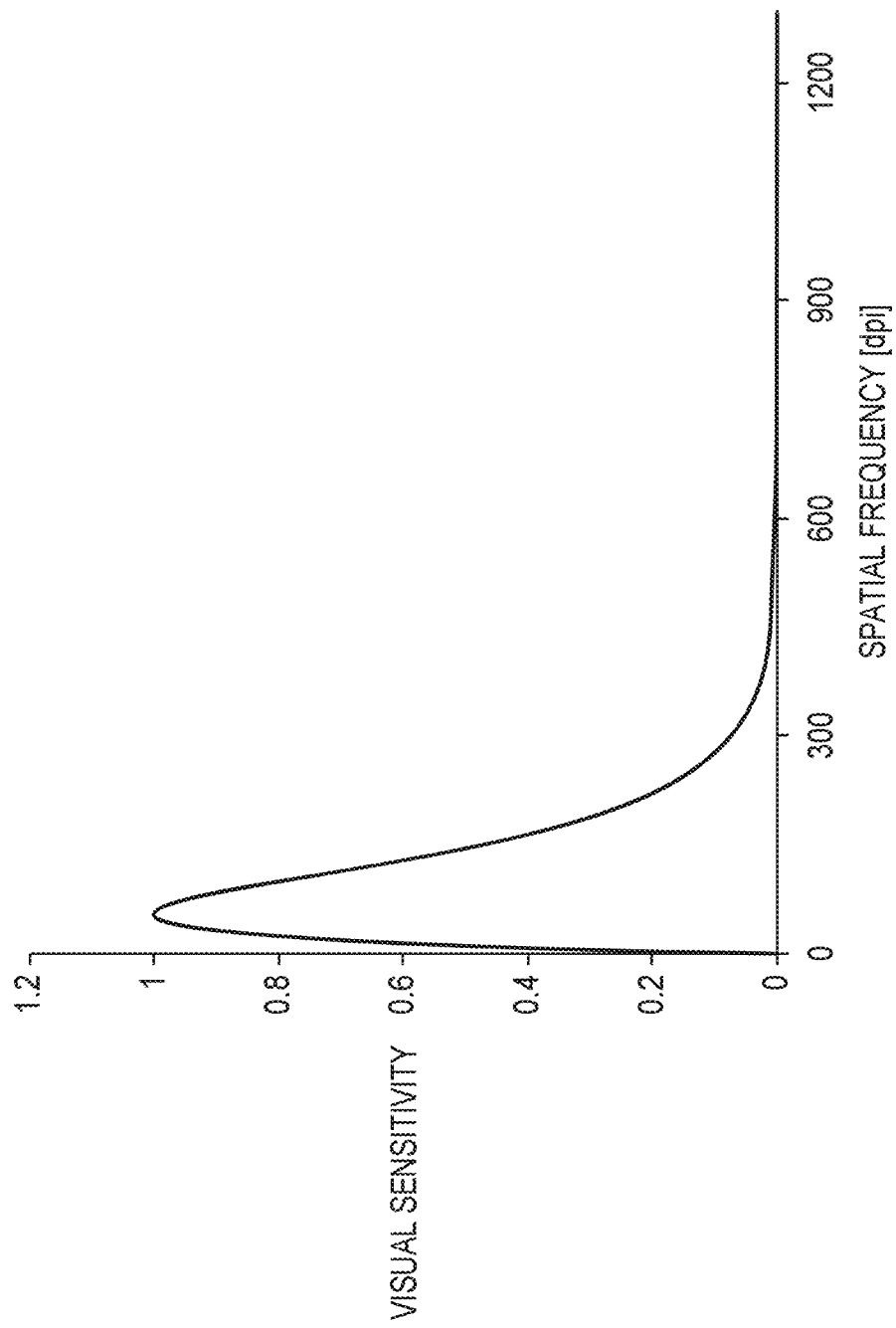
FIG. 10 is a graph showing a visual characteristic.

FIG. 10 is a graph showing a visual characteristic calculated by a known method (Dooley's approximation). In FIG. 10, the observation distance is 300 mm. As shown in FIG. 10, the sensitivity concerning the visual characteristic in a spatial frequency region higher than 600 dpi is low, and the influence on image quality is small. Hence, even if the information of the spatial frequency region higher than 600 dpi is lost from the input image data i whose input resolution α is higher than 600 dpi, the influence on image quality is small.

In step S907, an image recovery processing unit 108 acquires the recovery filter for 600 dpi from a recovery processing parameter holding unit 103, and executes filter processing for the resolution-converted input image data i using the recovery filter for 600 dpi. In step S908, the resolution conversion processing unit 109 executes resolution conversion processing for the filtered input image data i such that the resolution becomes 1,200 dpi, thereby generating image data i' after recovery processing. After the process of step S908, the process advances to step S909.

The method of resolution conversion in step S908 is not particularly limited. For example, to reduce degradation in sharpness, a nearest neighbor method may be used. Additionally, the resolution conversion processing executed in step S908 is enlargement processing by an integer multiple from 600 dpi to 1,200 dpi. Since all pixels are enlarged at the same ratio, generation of a moiré can be reduced.

In step S909, the resolution conversion processing unit 109 stores the image data i' after recovery processing in a data memory unit 104, and ends the processing shown in FIG. 9.

In this embodiment, when image data having a resolution higher than 600 dpi is input, the information of a high-frequency region higher than 600 dpi is lost. However, image quality is improved by recovering, by filter processing, information in a region of 4 cycles/mm or less (about 200 dpi or less) where the sensitivity concerning the visual characteristic is high. In addition, since the filter processing is executed for image data of 600 dpi, the processing time can be shortened to about ¼ as compared to a case in which filter processing is performed for image data of 1,200 dpi.

[Third Embodiment]

In this embodiment, a form in which no recovery filter is held, and filter processing is performed by generating a necessary recovery filter as needed based on output conditions and the number of pixels of input image data will be described. Points different from the first and second embodiments will be described below.

Figure 11:
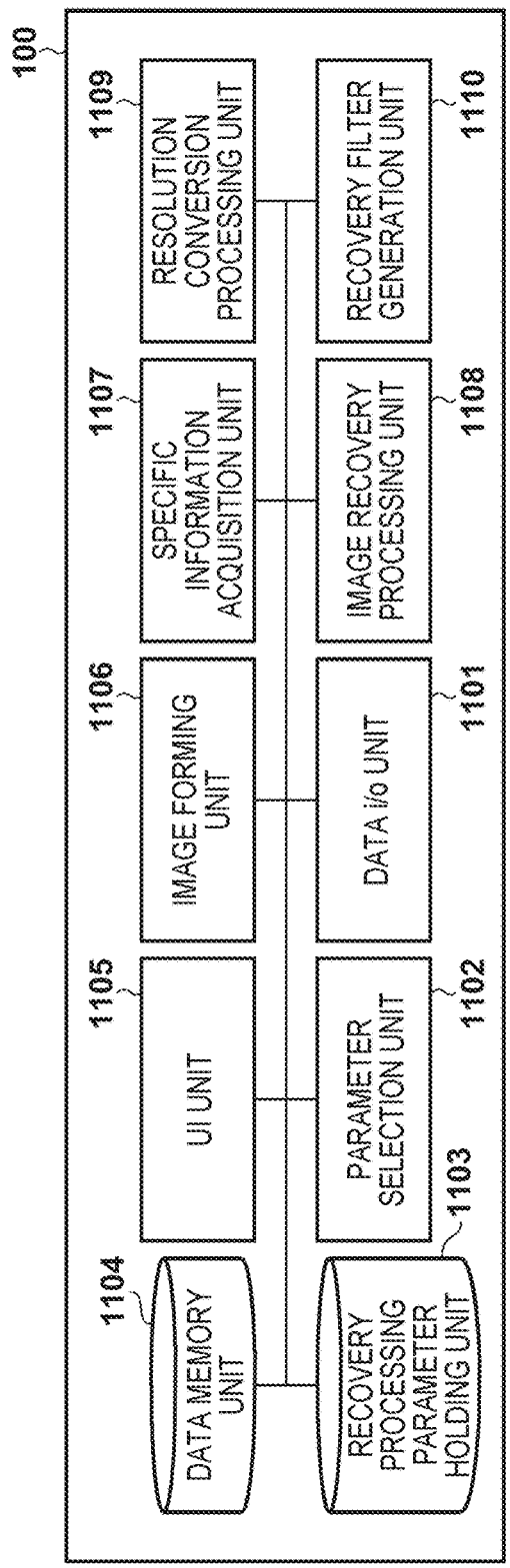
FIG. 11 is a block diagram showing the arrangement of an image forming apparatus.

FIG. 11 is a block diagram showing the arrangement of an image forming apparatus 100 according to this embodiment. In FIG. 11, the image forming apparatus 100 includes a recovery filter generation unit 1110 in addition to the arrangement shown in FIG. 1.

FIG. 12 is a flowchart showing resolution conversion and recovery processing according to this embodiment. The processing shown in FIG. 12 is implemented when, for example, a CPU 110 loads a program stored in a ROM 111 to a RAM 112 and executes it.

In step S1201, a resolution conversion processing unit 1109 calculates an input resolution α from the number of pixels (the numbers of pixels in the vertical and horizontal directions) of input image data i and the output size (inch). In step S1202, the resolution conversion processing unit 1109 acquires a print data generation processing resolution β based on output conditions Oi.

In step S1203, the resolution conversion processing unit 1109 calculates, as a filter processing resolution γ, a minimum divisor equal to or more than the input resolution α out of the divisors of the print data generation processing resolution β. For example, if the print data generation processing resolution β is 1,200 dpi, and the input resolution α is 200 dpi, the filter processing resolution γ is calculated as 200 dpi. Additionally, for example, if the print data generation processing resolution β is 1,200 dpi, and the input resolution α is 210 dpi, the filter processing resolution γ is calculated as 240 dpi.

In step S1204, the recovery filter generation unit 1110 generates a recovery filter corresponding to the filter processing resolution γ. A recovery processing parameter holding unit 1103 stores frequency characteristic information corresponding to various output conditions Oi in advance based on the type of a printing medium and image quality. The recovery filter generation unit 1110 acquires frequency characteristic information corresponding to the selected output conditions Oi. The recovery filter generation unit 1110 generates a recovery filter based on the acquired frequency characteristic and the filter processing resolution γ using the above-described filter generation method.

In step S1205, the resolution conversion processing unit 1109 determines whether the filter processing resolution γ equals the print data generation processing resolution β. Upon determining that the filter processing resolution γ equals the print data generation processing resolution β, the process advances to step S1210. Upon determining that the filter processing resolution γ is different from the print data generation processing resolution β, the process advances to step S1206.

In step S1206, the resolution conversion processing unit 1109 executes resolution conversion processing such that the resolution of the input image data i becomes γ dpi. In step S1207, an image recovery processing unit 1108 executes filter processing for the resolution-converted input image data i using the recovery filter for γ dpi generated in step S1204. In step S1208, the resolution conversion processing unit 1109 executes resolution conversion processing for the filtered input image data i such that the resolution becomes β dpi, thereby generating image data i' after recovery processing. After the process of step S1208, the process advances to step S1209.

The method of resolution conversion in step S1208 is not particularly limited. For example, to reduce degradation in sharpness, a nearest neighbor method may be used. Additionally, the resolution conversion processing executed in step S1208 is enlargement processing by an integer multiple from γ dpi to β dpi. Since all pixels are enlarged at the same ratio, generation of a moiré can be reduced.

Upon determining in step S1205 that the filter processing resolution γ equals the print data generation processing resolution β, the process advances to step S1210.

In step S1210, the resolution conversion processing unit 1109 executes resolution conversion processing for the input image data i such that the resolution becomes γ (=β) dpi. In step S1211, the image recovery processing unit 1108 executes filter processing for the resolution-converted image data using the recovery filter for γ dpi generated in step S1204, thereby generating the image data i' after recovery processing. After the process of step S1211, the process advances to step S1209.

In step S1209, image recovery processing unit 1108 stores the image data i' after recovery processing in a data memory unit 1104. After the process of step S1209, the processing shown in FIG. 12 ends.

As described above, the filter processing resolution γ is decided from the input resolution α acquired based on the output size and the number of pixels of input image data and the print data generation processing resolution β decided based on the output conditions, and a corresponding recovery filter is generated by the recovery filter generation unit 1110. Since a plurality of recovery filters need not be held, the memory utilization can be reduced. Resolution conversion and filter processing are appropriately controlled, thereby improving image quality while reducing the processing time.

The above-described embodiments are applicable not only to recovery processing for degradation in sharpness but also to filter processing such as general sharpness processing or edge enhancement processing. The resolution conversion and recovery processing may be executed by the host device or the image forming unit. All or some of the processes of the print data generation processing unit shown in FIG. 5 may be executed by the host device. The resolution conversion and recovery processing need not be executed before all print data generation processes and may be executed, for example, after execution of color correction processing or color conversion processing. The image forming apparatus 100 according to the embodiments is not limited to an inkjet printing apparatus having a serial-type printhead. The image forming apparatus 100 may be, for example, an inkjet printing apparatus having a line-type printhead or a printing apparatus of another type such as a thermal transfer printing apparatus or sublimation-type printing apparatus.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110803, filed May 29, 2015, which is hereby incorporated by reference herein in its entirety.

What is claimed is:

1. An apparatus for processing image data, comprising:
   an image data acquisition unit configured to acquire image data;
   a decision unit configured to decide, based on a resolution of the image data acquired by the image data acquisition unit and a target resolution to be used in generation of print data, a first resolution higher than the resolution of the image data and closest to the resolution of the image data out of divisors of the target resolution;
   a first resolution conversion unit configured to convert the image data acquired by the image data acquisition unit into first image data having the first resolution decided by the decision unit;
   a filter acquiring unit configured to acquire a filter corresponding to the first resolution which is one of the divisors of the target resolution, wherein the filter is used to compensate for degradation in quality of an image represented by the image data, which can occur when the image data is processed for printing;
a filter processing unit configured to process the first image data converted by the first resolution conversion unit using the filter acquired by the filter acquiring unit;
a second resolution conversion unit configured to convert the first image data processed by the filter processing unit into second image data having the target resolution; and
a generation unit configured to generate the print data based on the second image data converted by the second resolution conversion unit.

2. The apparatus according to claim 1, wherein the filter processing unit processes the first image data converted by the first resolution conversion unit using the filter corresponding to a value of the first resolution.

3. The apparatus according to claim 1, further comprising:
a test printing unit configured to print a plurality of test images of different spatial frequencies for each of a plurality of directions on a printing medium; and
a filter generating unit configured to generate the filter based on the test images printed by the test printing unit,
wherein the filter acquiring unit acquires the filter generated by the filter generating unit.

4. The apparatus according to claim 3, further comprising:
a reading unit configured to read the test images printed by the test printing unit,
wherein the filter generating unit generates the filter based on a reading result of the reading unit.

5. The apparatus according to claim 1, wherein the filter processing unit executes processing by the filter for brightness of the image data acquired by the image data acquisition unit.

6. The apparatus according to claim 1, wherein the filter comprises a filter configured to compensate for degradation in sharpness of the image that occurs when the image is printed by a printing apparatus.

7. The apparatus according to claim 6, wherein the filter comprises a filter configured to compensate for the degradation in the sharpness of the image in a frequency region lower than a spatial frequency determined in advance based on a visual characteristic.

8. The apparatus according to claim 1, wherein the decision unit decides, as the first resolution, a minimum resolution out of a plurality of values corresponding to the filter, which are prepared in advance and are higher than a value of the resolution of the image data and lower than a value of the target resolution.

9. The apparatus according to claim 1, further comprising:
a condition acquisition unit configured to acquire a condition to process the image data, wherein the filter is generated
based on the condition acquired by the condition acquisition unit.

10. The apparatus according to claim 1, further comprising a determination unit configured to determine whether a value of the resolution of the image data acquired by the image data acquisition unit is not more than a predetermined value,
wherein in a case where the determination unit determines that the value of the resolution of the image data is not more than the predetermined value, decision by the decision unit is performed.

11. The apparatus according to claim 10, wherein in a case where the determination unit determines that the value of the resolution of the image data is more than the predetermined value, resolution conversion is performed such that the resolution of the image data changes to the target resolution, and
the filter processing unit processes, using the filter, the image data that has undergone the resolution conversion.

12. A method executed in an apparatus for processing image data, comprising:
acquiring image data;
deciding, based on a resolution of the acquired image data and a target resolution to be used in generation of print data, a first resolution higher than the resolution of the image data and closest to the resolution of the image data out of divisors of the target resolution;
converting the acquired image data into first image data having the decided first resolution;
acquiring a filter corresponding to the first resolution which is one of the divisors of the target resolution, wherein the filter is used to compensate for degradation in quality of an image represented by the image data, which can occur when the image data is processed for printing;
processing the converted first image data using the acquired filter;
converting the processed first image data into second image data having the target resolution; and
generating the print data based on the converted second image data.

13. The method according to claim 12, wherein the first image data is processed using the filter corresponding to a value of the first resolution.

14. The method according to claim 12, wherein the first image data is processed by the filter for brightness of the acquired image data.

15. The method according to claim 12, wherein the filter comprises a filter configured to compensate for degradation in sharpness of the image that occurs when the image is printed by a printing apparatus.

16. The method according to claim 15, wherein the filter comprises a filter configured to compensate for the degradation in the sharpness of the image in a frequency region lower than a spatial frequency determined in advance based on a visual characteristic.

17. The method according to claim 12, wherein a minimum resolution out of a plurality of values corresponding to the filter is decided as the first resolution, wherein the plurality of values are prepared in advance and are higher than a value of the resolution of the image data and lower than a value of the target resolution.

18. The method according to claim 12, further comprising:
acquiring a condition to process the image data, wherein the filter is generated based on the acquired condition.

19. A non-transitory computer-readable storage medium storing a program that causes a computer to execute:
acquiring image data;
deciding, based on a resolution of the acquired image data and a target resolution to be used in generation of print data, a first resolution higher than the resolution of the image data and closest to the resolution of the image data out of divisors of the target resolution;
converting the acquired image data into first image data having the decided first resolution;
acquiring a filter corresponding to the first resolution which is one of the divisors of the target resolution, wherein the filter is used to compensate for degradation in quality of an image represented by the image data, which can occur when the image data is processed for printing;

processing the converted first image data using the acquired filter;

converting the processed first image data into second image data having the target resolution; and generating the print data based on the converted second image data.

20. The apparatus according to claim 1, further comprising a filter holding unit configured to hold filters corresponding to the divisors of the target resolution.

* * * * *